United States Patent

Sakamaki

[19]

[11] Patent Number: 5,827,081
[45] Date of Patent: *Oct. 27, 1998

[54] ROTARY CONNECTOR APPARATUS

[75] Inventor: Takashi Sakamaki, Tokyo, Japan

[73] Assignee: Niles Parts Co., Ltd., Japan

[*] Notice: The term of this patent shall not extend beyond the expiration date of Pat. No. 5,645,441.

[21] Appl. No.: 803,515

[22] Filed: Feb. 20, 1997

Related U.S. Application Data

[63] Continuation-in-part of Ser. No. 444,040, May 18, 1995, Pat. No. 5,645,441.

[30] Foreign Application Priority Data

Mar. 1, 1996 [JP] Japan ................................ 8-071368

[51] Int. Cl.$^6$ .................................................. H01R 35/04
[52] U.S. Cl. ............................................. 439/164; 439/15
[58] Field of Search ............................ 439/164, 15, 942, 439/874

[56] References Cited

FOREIGN PATENT DOCUMENTS 7-263105  10/1995  Japan .

Primary Examiner—Gary F. Paumen
Attorney, Agent, or Firm—Rader, Fishman & Grauer

[57] ABSTRACT

A rotary connector apparatus having an improved structure for connecting a flexible cable 4 of the apparatus with a wire harness 7. The rotary connector apparatus includes a stator housing 1 and a rotor housing 2 rotatably mounted on the stator housing 1. The flexible cable 4 is received in a spiral formation within a space formed between the stator housing 1 and the rotor housing 2. A terminal 5 is electrically connected to an electric wire 4a exposed from the flexible cable 4. A supporter 6 is molded with the terminal 5 and fixed to at least one of the stator housing 1 and the rotor housing 2. The wire harness 7 is electrically connected to the terminal 5 by welding or the like. The supporter 6 forms a holding portion 6b for holding and guiding the end point of the wire harness 7, thereby facilitating welding of the flexible cable to the wire harness.

13 Claims, 4 Drawing Sheets

ROTARY CONNECTOR APPARATUS

CROSS-REFERENCE TO RELATED APPLICATION

The present application is a continuation in part of U.S. application Ser. No. 08/444,040 filed May 18, 1995, now U.S. Pat. No. 5,645,441.

BACKGROUND OF THE INVENTION

1. Field of the Invention

The present invention relates generally to a rotary connector apparatus mounted on, for example, a pad portion of an automotive steering wheel for supplying electric power to an air bag or the like. More specifically, the present invention relates to an improvement of a structure for connecting the flexible cable of a rotary connector apparatus with a wire harness.

2. Description of the Related Art

A conventional rotary connector apparatus is disclosed, for example, in Japanese Patent Publication No. JP A-7-263105. The external connection harness of the conventional rotary connector apparatus has a plurality of core wires fixed on each terminal piece using an electric resistance welding method, an ultrasonic wave welding method, or the like.

However, a problem exists when connecting the external connection harness of the conventional rotary connector apparatus. Specifically, in the external connection harness of the conventional rotary connector apparatus, when each of the core wires is welded on each terminal piece, the multiple strands of the core wires are scattered as shown in the drawings of the above-mentioned Japanese Patent Publication No. JP A-7-263105, thereby resulting in an unstable quality of the welded portion. To overcome this problem, the conventional core wire of the external connection harness has been fixed by using a compression press work, a soldering work, a return work or the like in order to prevent scattering at the welded portion.

However, when the core wire in the external connection harness of the rotary connector apparatus is fixed at the welded portion by using the compression press work, the welding work, the return work or the like, the number of process steps and manufacturing cost is undesirably increased.

SUMMARY OF THE INVENTION

It is an object of the present invention to provide an improved rotary connector apparatus that overcomes the problems associated with the conventional rotary connector apparatus described above.

More specifically, it is an object of the present invention to fix the core wire of a wire harness of a rotary connector to a wire harness by providing a holding portion for holding the end point of the wire harness on a supporter.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a rotary connector apparatus is provided comprising: a stator housing; a rotor housing mounted rotatably on the stator housing; a flexible cable received in a spiral formation within a space formed between the stator housing and the rotor housing; a terminal electrically connected to an electric wire exposed from the flexible cable; a supporter molded with the terminal and fixed on at least one of the stator housing and the rotor housing; and a harness connected to the terminal. The rotary connector apparatus is characterized by the supporter having a holding portion for holding an end point of the harness.

The holding portion is preferably formed at a portion of the supporter adjacent to the terminal in a recess portion of the supporter. A welding portion of the terminal is exposed in the recess portion. The holding portion is formed in the supporter on or adjacent to the welding portion. The supporter also preferably comprises a press groove adjacent to the recess portion into which a coating film of the harness is inserted.

The holding portion of the rotary connector apparatus according to a first embodiment comprises a holding groove into which a core wire or a coating film of an end point of the harness is inserted.

The holding portion of the rotary connector apparatus according to a second embodiment comprises a rib formed on the welding portion of the terminal in the recess portion.

In accordance with another aspect of the present invention, a rotary connector apparatus is provided which comprises a stator housing, a rotor housing mounted rotatably on the stator housing, a flexible cable received in a spiral formation within a space formed between the stator housing and the rotor housing, a terminal electrically connected to the flexible cable, a harness having at least one multistrand core wire electrically connected to the terminal, and a supporter molded with the terminal and fixed on at least one of the stator housing and the rotor housing. The rotary connector apparatus is characterized by the supporter comprising a holding means for holding an end portion of the core wire and preventing individual strands of the core wire from scattering when a portion of the core wire adjacent to the end portion is connected to the terminal.

According to the first embodiment of the present invention, the supporter comprises a recess exposing a portion of the terminal, and the holding means comprises a first groove positioned on a first side of the recess and a second groove positioned on a second side of the recess, the core wire having a coating film on the end portion which is received in the first groove and a coating film on an intermediate portion which is received in the second groove. The core wire further comprises an exposed portion between the first and second grooves which is welded to the exposed portion of the terminal.

According to the second embodiment of the present invention, the supporter comprises a recess exposing a portion of the terminal, and the holding means comprises a pair of ribs positioned on a first side of the recess, the ribs defining a groove-shaped slanted surface, and a press groove positioned on a second side of the recess. The end portion of the core wire is received and contained between the ribs, and an exposed portion of the core wire between the ribs and the press groove is welded to the exposed portion of the terminal.

BRIEF DESCRIPTION OF THE DRAWINGS

The present invention will become more clearly appreciated as the disclosure of the invention is made with reference to the accompanying drawings. In the drawings:

FIGS. 4(a) to 4(c) are enlarged views showing the main portion of the supporter according to the first embodiment of the present invention, wherein FIG. 4(a) is an enlarged plan view, FIG. 4(b) is an enlarged side view, and FIG. 4(c) is a sectional view taken along the line A—A in FIG. 4(a).

FIGS. 5(a) and 5(b) are enlarged views showing the main portion of the supporter according to a second embodiment of the present invention, wherein FIG. 5(a) is an enlarged plan view and FIG. 5(b) is a sectional view taken along the line B—B in FIG. 5(a).

DETAILED DESCRIPTION OF THE PREFERRED EMBODIMENTS

Figure 1:
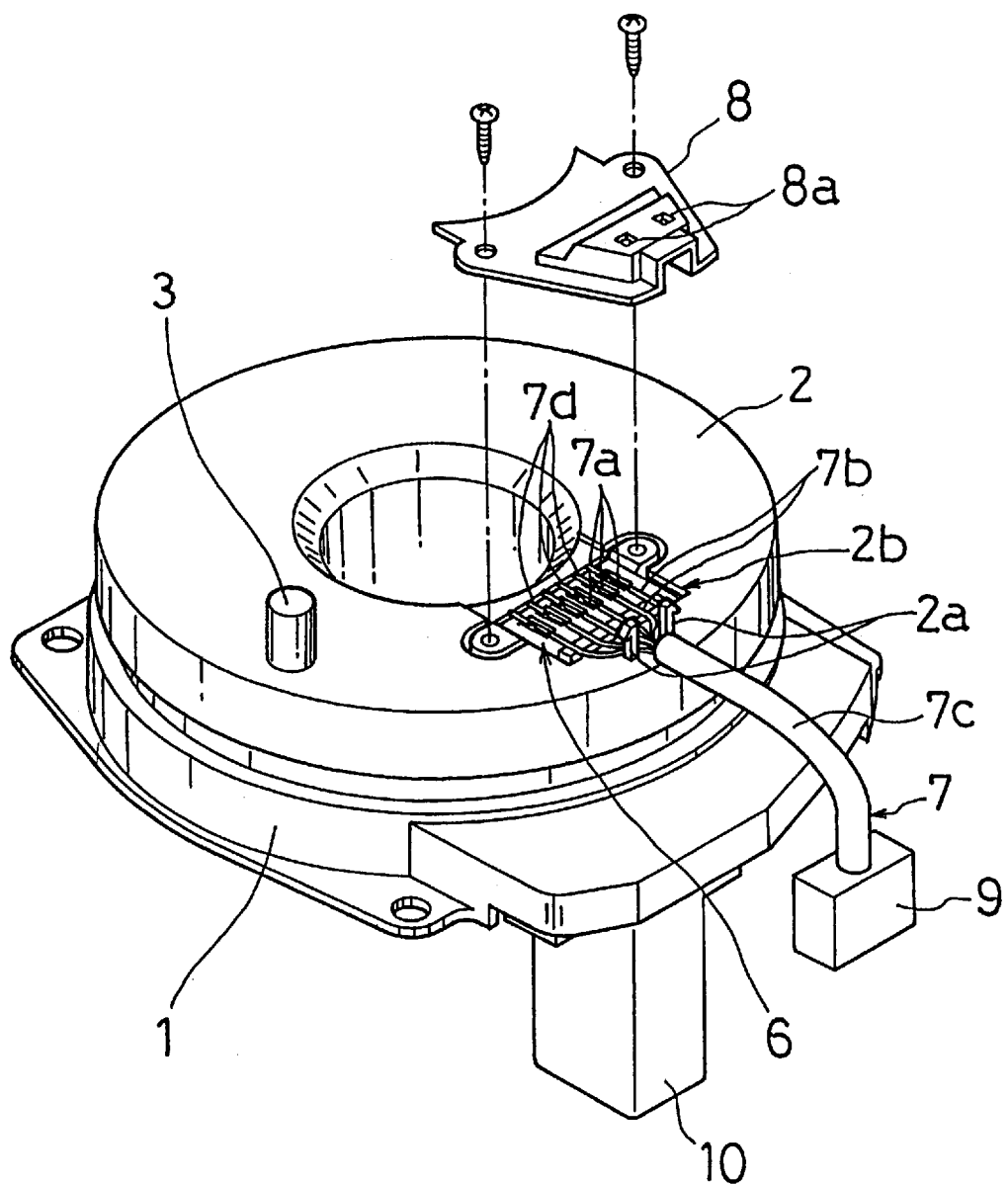
FIG. 1 is an exploded perspective view showing a rotary connector apparatus according to a first embodiment of the present invention.

A first embodiment of the present invention will now be described, by way of example, with reference to FIGS. 1 to 4 of the accompanying drawings.

The rotary connector apparatus includes a stator housing 1 mounted on a combination switch of, for example, an automobile. A rotor housing 2 is rotatably mounted on the stator housing 1 and coupled to a steering wheel (not shown) by using a connection pin 3. The rotor housing 2 is provided with the connection pin 3 and a pair of resilient claws 2a on which a cover 8 is mounted.

At the portion adjacent to the resilient claws 2a, a mounting hole 2b is provided in order to mount the supporter 6. The supporter 6 is disposed under the mounting hole 2b, and the cover 8 is disposed above the mounting hole 2b. The peripheral portion of the mounting hole 2b is secured by the supporter 6 and the cover 8. The connection pin 3 is projected from the upper surface of the rotor housing 2 and coated by a resilient rubber or the like.

Figure 3:
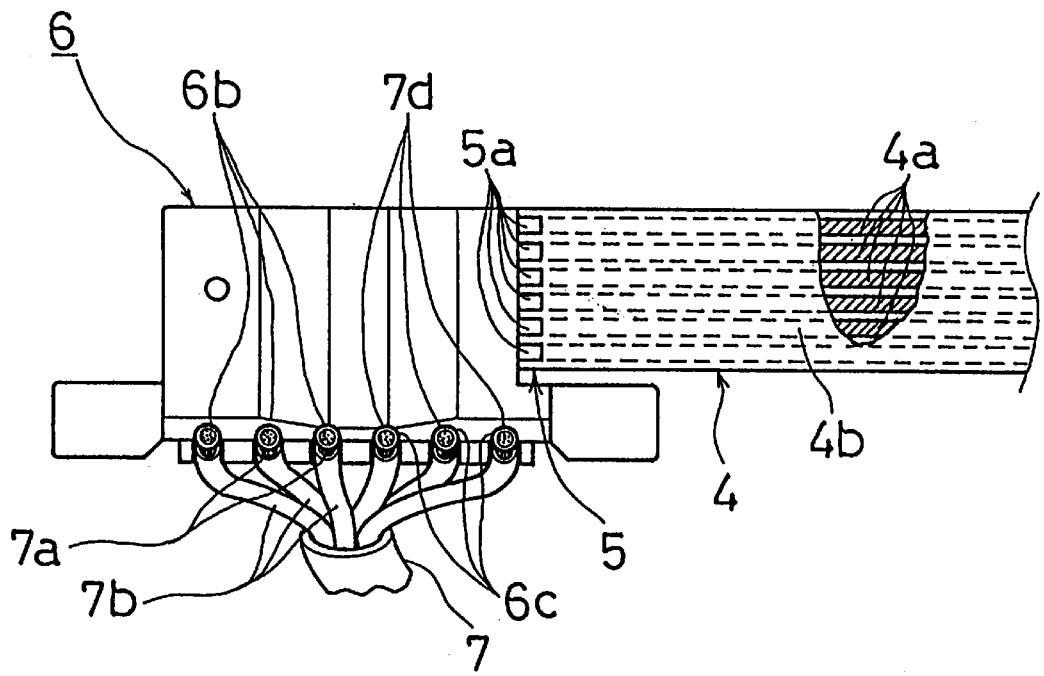
FIG. 3 is a side view showing the supporter according to the first embodiment of the present invention.

The flexible cable 4 is, as shown in FIG. 3, a so-called flat cable having electric wires 4a that are molded together by a resin film 4b. The flexible cable 4 is received within the doughnut-shaped space formed between the stator housing 1 and the rotor housing 2. One end of the flexible cable 4 is connected with the stator housing 1, and the other end thereof is connected with the rotor housing 2, respectively.

A terminal 5 is made of a metallic material, such as copper or the like, and molded within the L-shaped resin supporter 6 by using an insert molding method. The terminal 5 has a plurality of terminal pieces 5a to be connected to each of the electric wires 4a, which are arranged in parallel within the flexible cable 4. The terminal 5 also has a plurality of welding portions 5b to be connected to each of the core wires 7a of the wire harness 7. The terminal pieces 5a provide a connecting portion for the electric wires 4a, which connecting portion is projected from the supporter 6 as shown in FIG. 3. The welding portion 5b is exposed within the recess portion 6a of the supporter 6, as shown in FIGS. 2, 4(a), 4(b) and 4(c), and fixed with the core wire 7a by using electric resistance welding, ultrasonic wave welding, or the like.

The supporter 6 is made of molded resin including terminals 5, and fixed on the rotor housing 2. As shown in FIG. 1, the wire harness 7 having a connector 9 at its end is mounted to the supporter 6 by passing through the mounting hole 2b from the lower surface of the rotor housing 2. The wire harness 7 is secured on the rotor housing 2 by fitting the cover 8 to the resilient claws 2a. The cover 8 is fixed on the supporter 6 by using screws. Thus, the supporter 6 serves as a junction member for electrically connecting the flexible cable 4 with the external connection harness 7.

The supporter 6 has a recess portion at its center portion, a holding portion 6b for holding a coating film 7d, and a press groove 6d into which the coating film 7b is inserted with pressure for holding a coating film 7b at the periphery portion of the recess portion 6a. The holding groove 6c, the welding portion 5b, the recess portion 6a, and the press groove 6d of the supporter 6 are aligned on the same line. Moreover, the supporter 6 may be secured on the stator housing 1.

The recess portions 6a are rectangular holes, and the number of the recess portions 6a is at least as many as the number of core wires 7a. The structure of the recess portion 6a is not limited to the particular described above, as long as the welding portion 5b of the terminal 5 formed within the supporter 6 by using the insert molding method is exposed.

Figure 4A:
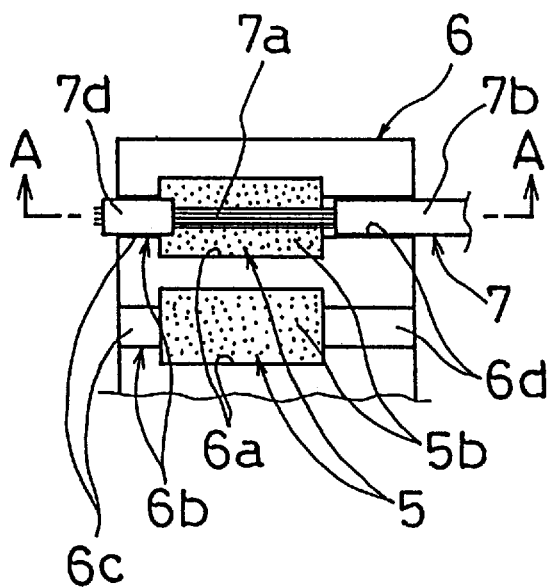
Figure 4B:
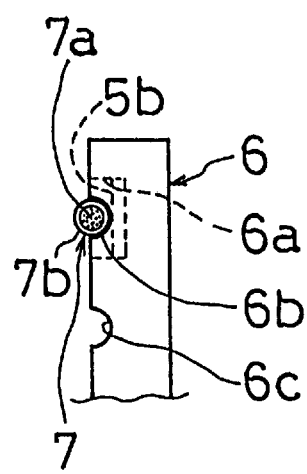
Figure 4C:
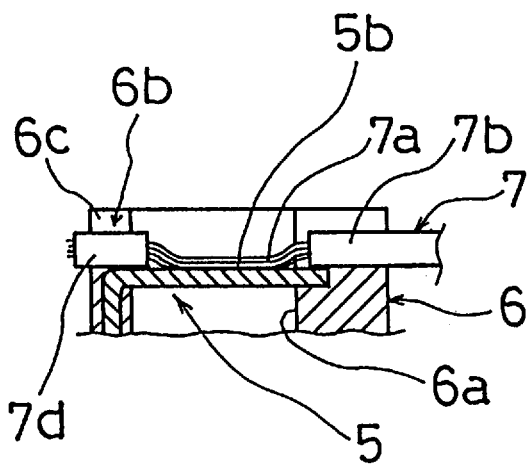

The holding portion 6b is composed of the core wire 7a at the end point of the wire harness 7 within the recess portion 6a of the supporter 6, or the holding groove 6c into which the coating film 7d made of resin material or the like is inserted. The holding portion 6b is formed at the portion adjacent to the terminal 5. As shown in FIG. 4(b), the holding groove 6c is a groove having a semi-circular shape into which the holding portion 6b is fitted or inserted. The holding groove 6c is disposed at the adjacent portion of the welding portion 5b.

Figure 2:
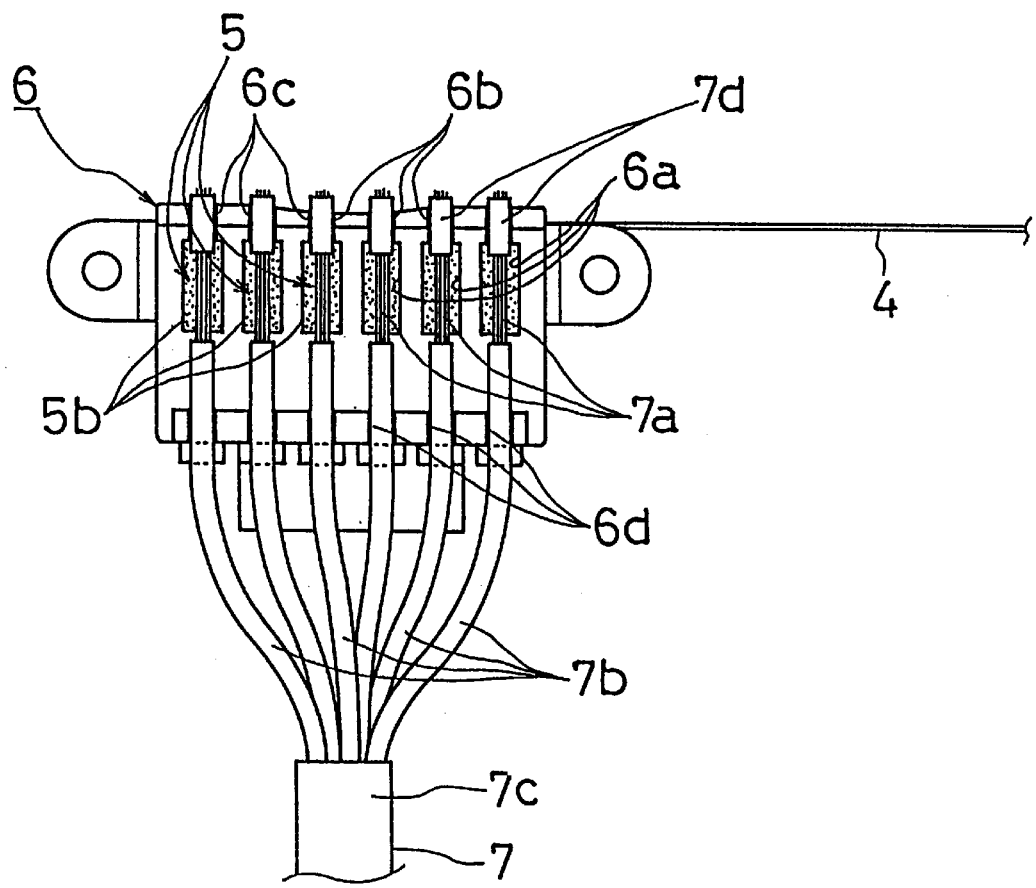
FIG. 2 is a plan view showing the supporter according to the first embodiment of the present invention.

The wire harness 7 is composed of a plurality of core wires 7a coated with the coating film 7b, and the coating film 7b is covered with a tube 7c. As shown in FIG. 1, the wire harness 7 is coupled to the supporter 6 at its one end, and another end thereof is connected to the connector 9. Moreover, the wire harness 7 has, as shown in FIGS. 2 and 3, the coating film 7b, which is exposed by stripping away the tube 7c, and the core wire 7a, which is exposed by stripping away the coating film 7b. As shown in FIG. 2, the end point of the coating film 7b is fitted with pressure into the holding groove 6c, and at a portion adjacent the end point of the wire harness 7 a part of the coating film 7b is stripped from the core wire 7a to expose the core wire 7a. The core wire 7a is then welded to the welding portion 5b by using the electric resistance welding method, the ultrasonic wave welding method, or the like. The coating film 7b is supported such that the portion between the welding portion 5b and the tube 7c, namely the portion adjacent to the recess portion 6a, is fitted into the press groove 6d.

As shown in FIG. 1, the cover 8 is secured on the rotor housing 2 such that the contact holes 8a are contacted to the resilient claws 2a projected from the rotor housing 2 adjacent to the mounting hole 2b, and the cover 8 is screwed to the supporter 6 thereby closing the mounting hole 2b. The connector 9 is connected to a counter-side connector (not shown) of the steering wheel. A connector 10 is disposed at the lower surface of the stator housing 1 and may be formed as an integral body with the stator housing 1. The connector 10 is connected to the counter-side connector (not shown) mounted on the steering column or body of the automobile.

The operation of a first embodiment of the present invention as described above will now be described by reference to the process of connecting the wire harness 7 to the flexible cable 4.

In the wire harness 7, the tube 7c is stripped off from the end of the wire harness, and then the coating film 7b is stripped off from the core wire 7a leaving a coating film 7d at an end portion of the wire harness and an exposed portion of the core wire 7a between the coating film 7d and the coating film 7b. The one end of the core wire 7a is connected with the connector 9. The other end of the wire harness 7, as shown in FIGS. 1 to 4, is held such that the coating film 7d at the end point thereof is fitted into the holding groove 6c with pressure. As shown in FIGS. 2, 4(a), 4(b) and 4(c), the exposed core wire 7a is disposed on the welding portion 5b at a portion adjacent the coating film 7d located at the end point of the wire harness 7. Each of the coating films 7b is held by being inserted into each of the press grooves 6d with pressure.

In the wire harness 7, the coating film 7b and the coating film 7d, which are located at both ends of the exposed core wire 7a welded on the welding portion 5b, are held securely. By this structure, the core wire 7a is aligned on the center portion of the welding portion 5b, and fixed thereon. The core wire 7a can then be easily fixed to the welding portion 5b by using the electric resistance welding method, the ultrasonic wave welding method, or the like. The multiple strands of the core wire 7a in the wire harness 7 are prevented from scattering because the coating film 7d remains at the end point of the wire harness 7. Therefore, the core wire 7a does not require any solder or press work for avoiding such scattering. The core wire 7a is held such that both of the coating films 7b and 7d are fitted into the holding grooves 6c and the press grooves 6d, respectively. Therefore, when welding the wire harness 7 on the welding portion 5b, it is unnecessary to hold the wire harness 7 by using human hands, a fastening member, or the like, thereby achieving an easy operation and a reliable welding.

As shown in FIG. 3, each of electric wires 4a of the flexible cable 4 is connected to each terminal piece 5a, respectively. The other end of the flexible cable 4 is connected to the connector 10.

The supporter 6 provided with the flexible cable 4 and the wire harness 7 is mounted such that the connector 9 is passed through the mounting hole 2b of the rotor housing 2 from the lower side in FIG. 1. The cover 8 is mounted such that contact holes 8a of the cover 8 are fitted with the claws 2a provided on the rotor housing 2, respectively. The cover 8 is then fixed on the supporter 6 by using screws. By this arrangement, both the cover 8 and the supporter 6 grip the periphery portion of the mounting holes 2b and are fixed on the rotor housing 2.

The flexible cable 4 is received within the case composed of the stator housing 1 and the rotor housing 2, and the rotor housing 2 and the connector 9 are attached on the steering side of the rotary connector apparatus. The stator housing 1 and the connector 10 are attached on the automobile body side of the rotary connector apparatus.

Figure 5A:
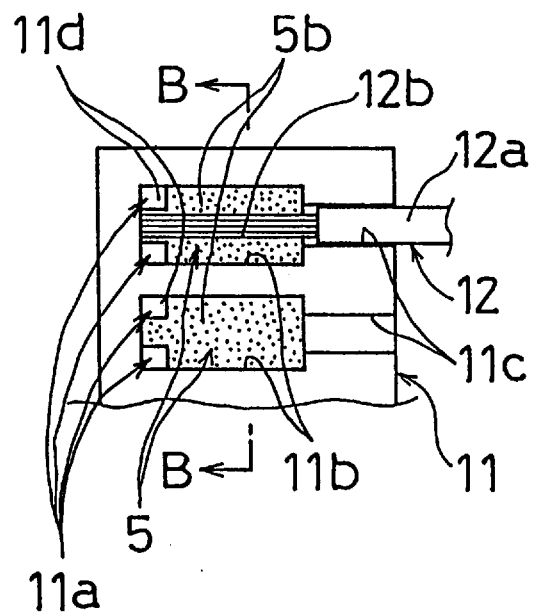
Figure 5B:
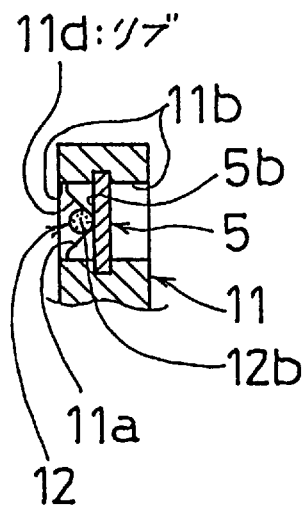

Referring now to FIGS. 5(a) and 5(b), a second embodiment of the present invention will be described hereinafter. In FIGS. 5(a) and 5(b), the same components which are present in the first embodiment are denoted by the same numerals as in the first embodiment. In the second embodiment, a wire harness 12 is used in which the coating film 7d at the end point of the wire harness 7 in the first embodiment is removed. Further, the core wire 12b of the wire harness 12 is held by using a holding portion 11a.

The supporter 11, as shown in FIGS. 5(a) and 5(b), has a welding portion 5b for the terminal 5 within a recess portion 11b. The supporter 11 also has a holding portion 11a for holding the end point of the core wire 12b on the terminal 5. The holding portion 11a is composed of ribs 11d formed at both corners of a distal end of the recess portion 11b for holding the end point of the core wire 12b. Each of the ribs 11d has, for example, a groove-shaped slanted surface. A press groove 11c to be fitted with the coating film 12a with pressure is located adjacent to the recess portion 11b. Each rib 11d is composed of two slanted surfaces or the like projected oppositely from the inner wall of the recess portion 11b, in order to hold the core wire 12b by guiding it to the center position of the welding portion 5b. The structure of the rib 11d is not limited to the specific structure described above as long as a rib 11d or equivalent structure functions to grip the end of the core wire 12b.

The wire harness 12 has only the core wire 12b at the end point of the coating film 12a. The coating film 12a is held by being fitted into the press groove 11c with pressure. The core wire 12b is disposed on the welding portion 5b and welded. The multiple strands of the core wires 12b of the wire harness 12 are prevented from scattering because the end portion of the core wire 12b is fitted to the rib 11d with pressure.

When the core wire 12b is welded on the welding portion 5a, the wire harness 12 shown in FIGS. 5(a) and 5(b) is held at both sides of the core wire 12b on the welding portion 5b by fitting the coating film 12a into the press groove 11c with pressure. By this structure, the core wires 12b are guided and fixed at the center position of the welding portion 5b and, therefore, the core wires 12b are never scattered or moved. When welding the core wire 12b on the welding portion 5b, it is unnecessary to hold the wire harness 12 by using human hands, fastening members or the like, thereby achieving an easy welding operation.

Figure 6:
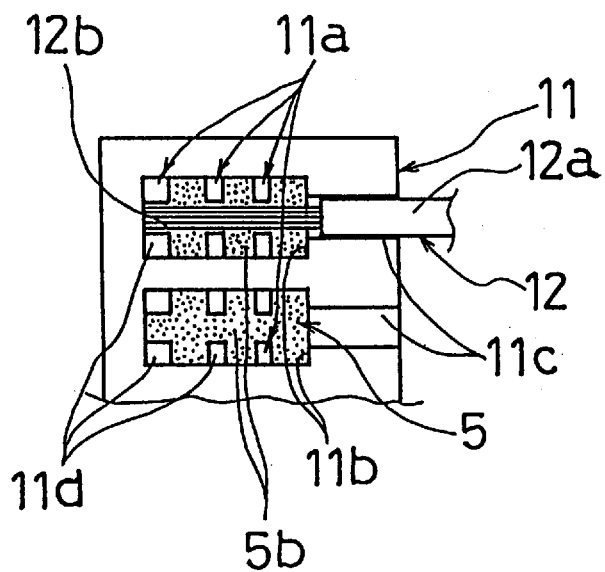
FIG. 6 is a plan view showing the supporter having a plurality of ribs according to the second embodiment of the present invention.

The holding portion 11a composed of the rib 11d may be provided with many ribs 11d within the recess portion 11b, as shown in FIG. 6. By holding the core wire 12b with a plurality of ribs 11d, the wire harness 12 is securely held, thereby preventing the multiple strands of the core wires 12b from scattering.

The rotary connector apparatus of the present invention having the structure described above has the following effects.

(1) The supporter is formed with a holding portion for holding the end portion of the wire harness. Therefore, when welding the wire harness to the terminal, it is unnecessary to hold the wire harness by using human hands, fastening members, or the like, thereby achieving an easy welding operation and a reliable weld.

(2) The holding portion is composed of a holding groove for holding the core wire at the end point of the wire harness or the coating film. The core wire of the wire harness or the coating film is guided and held at a desired position by being fitted into the holding groove, thereby achieving an easy welding operation upon welding the core wire to the welding portion of the terminal.

(3) The holding portion is provided at the position adjacent to the terminal, and the core wire is held at the center position of the terminal. Therefore, the core wire is electrically connected to the terminal with better reliability.

(4) The supporter forms the recess portion for exposing the welding portion of the terminal, and the holding portion for supporting the core wire of the wire harness. Therefore, it is easy to hold the core wire in a fixed position, thereby achieving an easy welding operation.

(5) The holding portion is composed of a rib formed on the welding portion of the terminal within the recess portion. Therefore, it is easy to hold the core wire by inserting it into the rib, thereby preventing the core wire from scattering and reducing the number of work processes and the manufacturing cost associated with collecting a scattered core wire.

(6) The supporter forms the press groove for fitting the coating film at the position adjacent to the recess portion. Therefore, it is possible to hold both ends of the core wire to be welded on the terminal, thereby achieving an easy welding operation by holding the core wire.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A rotary connector apparatus comprising:

a stator housing (1);

a rotor housing (2) mounted rotatably on said stator housing (1);

a flexible cable (4) received in a spiral formation within a space formed between said stator housing (1) and said rotor housing (2);

a terminal (5) electrically connected to an electric wire (4a) exposed from said flexible cable (4);

a supporter (6) molded with said terminal (5) and fixed on at least one of said stator housing (1) and said rotor housing (2); and a harness (7, 12) connected to said terminal (5);

wherein said supporter (6, 11) has a holding portion (6b, 11a) for holding an end point of said harness (7, 12).

2. The rotary connector apparatus according to claim 1, wherein said holding portion (6a) comprises a holding groove (6c) into which a core wire (7a) or a coating film (7b) of an end point of said harness (7) is inserted.

3. The rotary connector apparatus according to claim 1, wherein said holding portion (6b, 11a) is formed at a portion of said supporter (6, 11) adjacent to said terminal (5) in a recess portion (6a, 11b) of said supporter (6, 11).

4. The rotary connector apparatus according to claim 3, wherein a welding portion (5b) of said terminal (5) is exposed in said recess portion (6a, 11b), and said holding portion (6b, 11a) is formed in said supporter on or adjacent to said welding portion.

5. The rotary connector apparatus according to claim 4, wherein said holding portion (11a) comprises a rib (11d) formed on said welding portion (5b) of said terminal (5) in said recess portion (11b).

6. The rotary connector apparatus according to claim 1, wherein said supporter comprises a press groove adjacent to said recess portion into which a coating film of said harness is inserted.

7. A rotary connector apparatus comprising:

a stator housing;

a rotor housing mounted rotatably on said stator housing;

a flexible cable received in a spiral formation within a space formed between said stator housing and said rotor housing;

a terminal electrically connected to said flexible cable;

a harness having at least one multistrand core wire electrically connected to said terminal; and a supporter molded with said terminal and fixed on at least one of said stator housing and said rotor housing, said supporter comprising a holding means for holding an end portion of said core wire and preventing individual strands of said core wire from scattering when a portion of said core wire adjacent to said end portion is connected to said terminal.

8. The rotary connector apparatus according to claim 7, wherein said holding means comprises a holding groove into which said end portion of said core wire or a coating film covering said end portion is inserted.

9. The rotary connector apparatus according to claim 7, further comprising a coating film covering said end portion of said core wire for preventing scattering of individual strands of said core wire.

10. The rotary connector apparatus according to claim 7, wherein said holding means comprises a plurality of ribs which together provide a groove-shaped slanted surface for receiving and containing said end portion of said core wire.

11. The rotary connector apparatus according to claim 7, wherein said portion of said core wire adjacent to said end portion is electrically connected to said terminal by welding.

12. The rotary connector apparatus according to claim 7, wherein said supporter comprises a recess exposing a portion of said terminal, said holding means comprising a first groove positioned on a first side of said recess and a second groove positioned on a second side of said recess, said core wire having a coating film on said end portion which is received in said first groove and a coating film on an intermediate portion which is received in said second groove, said core wire further comprising an exposed portion between said first and second grooves which is welded to the exposed portion of said terminal.

13. The rotary connector apparatus according to claim 7, wherein said supporter comprises a recess exposing a portion of said terminal, said holding means comprising a pair of ribs positioned on a first side of said recess, said ribs defining a groove-shaped slanted surface, and a press groove positioned on a second side of said recess, said end portion of said core wire being received and contained between said ribs, and an exposed portion of said core wire between said ribs and said press groove being welded to the exposed portion of said terminal.

* * * * *